(12) United States Patent
Seibold

(10) Patent No.: US 11,390,145 B2
(45) Date of Patent: Jul. 19, 2022

(54) MOTOR VEHICLE

(71) Applicant: Dr. Ing. h.c. F. Porsche Aktiengesellschaft, Stuttgart (DE)

(72) Inventor: Thomas Seibold, Ostfildern (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 206 days.

(21) Appl. No.: 16/808,445

(22) Filed: Mar. 4, 2020

(65) Prior Publication Data

US 2020/0282813 A1   Sep. 10, 2020

(30) Foreign Application Priority Data

Mar. 6, 2019   (DE) .................... 10 2019 105 595.4

(51) Int. Cl.
*B60J 5/04*     (2006.01)
*B60J 1/10*     (2006.01)
*B60J 1/17*     (2006.01)

(52) U.S. Cl.
CPC . *B60J 5/04* (2013.01); *B60J 1/10* (2013.01); *B60J 1/17* (2013.01); *B60J 5/0402* (2013.01); *B60J 5/0416* (2013.01); *B60J 5/0463* (2013.01)

(58) Field of Classification Search
CPC . B60J 5/0402; B60J 5/0408; B60J 1/10; B60J 1/17; B60J 5/04
See application file for complete search history.

(56) References Cited

U.S. PATENT DOCUMENTS

| | | | | |
|---|---|---|---|---|
| 4,348,046 A | * | 9/1982 | Ohya | B60J 1/17 296/146.9 |
| 4,370,832 A | * | 2/1983 | Koike | B60J 10/74 49/490.1 |
| 4,473,252 A | * | 9/1984 | Tomforde | B60J 1/17 296/146.2 |
| 4,807,923 A | * | 2/1989 | Nakamura | B60J 10/248 296/146.2 |
| 4,919,471 A | * | 4/1990 | Seino | B60J 10/248 296/154 |

(Continued)

FOREIGN PATENT DOCUMENTS

DE   19943748 A1 * 3/2001
JP   1-69023        5/1989

(Continued)

OTHER PUBLICATIONS

Japanese Office Action dated Jan. 6, 2021.
Korean Examination Report.

*Primary Examiner* — Jason S Morrow
(74) *Attorney, Agent, or Firm* — Gerald E. Hespos; Michael J. Porco

(57) ABSTRACT

A motor vehicle (1) has a first front door (2) and a first rear door (3) arranged behind one another on a first longitudinal side of the motor vehicle (1), and a second front door and a second rear door arranged behind one another on a second longitudinal side of the motor vehicle (1). The second longitudinal side lies opposite the first longitudinal side. Each of the two front doors (2) has a lowerable door pane (4), and each of the two rear doors (3) has a fixed door pane (6). The rear doors (3) have a frameless configuration, and the fixed door panes (6) extending as far as the front doors (2).

8 Claims, 2 Drawing Sheets

(56) References Cited

U.S. PATENT DOCUMENTS

| | | | | |
|---|---|---|---|---|
| 4,988,142 | A * | 1/1991 | Chandler | B60J 5/0402 |
| | | | | 296/146.2 |
| 5,551,746 | A * | 9/1996 | Rhoades | B60J 1/17 |
| | | | | 296/146.2 |
| 8,454,077 | B2 * | 6/2013 | Charnesky | B60J 1/17 |
| | | | | 296/146.2 |
| 8,572,898 | B2 * | 11/2013 | Grudzinski | B60J 10/7775 |
| | | | | 49/502 |
| 8,650,802 | B2 * | 2/2014 | Grudzinski | B60J 10/79 |
| | | | | 49/502 |
| 10,940,745 | B2 * | 3/2021 | Ertl | B60J 10/77 |
| 10,974,576 | B2 * | 4/2021 | Choi | B60J 10/77 |
| 11,161,397 | B2 * | 11/2021 | Benson | B60J 1/17 |
| 2004/0174040 | A1 * | 9/2004 | Mikolai | E05B 83/38 |
| | | | | 296/146.2 |
| 2020/0114737 | A1 * | 4/2020 | Choi | B60J 5/0402 |

FOREIGN PATENT DOCUMENTS

| | | |
|---|---|---|
| JP | 1-148670 | 10/1989 |
| JP | 2000-233644 | 8/2000 |
| JP | 2012-514561 | 6/2012 |
| JP | 2016-113025 | 6/2016 |
| KR | 10-2018-0113603 | 10/2018 |

* cited by examiner

MOTOR VEHICLE

CROSS REFERENCE TO RELATED APPLICATION

This application claims priority under 35 USC 119 to German Patent Appl. No. 10 2019 105 595.4 filed on Mar. 6, 2019, the entire disclosure of which is incorporated herein by reference.

BACKGROUND

Field of the Invention

The invention relates to a motor vehicle, comprising a first front door and a first rear door that are arranged behind one another on a first longitudinal side of the motor vehicle, and a second front door and a second rear door that are arranged behind one another on a second longitudinal side of the motor vehicle, where the second longitudinal side is opposite the first longitudinal side. Each of the two front doors has a lowerable door pane, and each of the two rear doors has a fixed door pane.

Related Art

Motor vehicles that are configured with four doors (or with an additional tailgate defining a fifth door) have two opposite longitudinal sides. Each longitudinal side has one front door and one rear door arranged behind the front door in the vehicle longitudinal direction. An interior compartment of the motor vehicle is accessible when one of the doors is open. A lowerable door pane usually is arranged in each of the front doors and rear doors. This lowerable door pane can be driven either manually with the aid of a window winder or by an electric window lifting apparatus so that the window can be raised and lowered selectively by a user.

If the two front doors and the two rear doors of a four-door or five-door motor vehicle are configured as framed doors, a total of three exposed joints result in the side view of the motor vehicle in a pane region between the front door and the rear door. A first exposed joint results between the front door and the rear door between a frame trim panel of the front door and a frame trim panel of the rear door. A second exposed joint is between the lowerable door pane of the front door and the frame trim panel of the front door. A third exposed joint is between the lowerable door pane of the rear door and the frame trim panel of the rear door.

A motor vehicle with frameless front doors merely has two exposed joints in the side view in the pane region in the case of prior art motor vehicles. A first exposed joint is between the lowerable door pane of the front door and a frame trim panel of a door frame of the rear door. A second exposed joint is between the lowerable door pane of the rear door and the frame trim panel of the rear door.

JP 2016-113025 A1 discloses a motor vehicle where the rear doors have a fixed door pane fastened to the rear door.

The above-described exposed joints in prior art motor vehicles have a disadvantageous effect on the visual appearance of the motor vehicles in the side view when the front doors and rear doors are closed.

It is an object of the invention to provide a motor vehicle of the type mentioned above with an improved visual appearance in the side view.

SUMMARY

A motor vehicle according to the invention is distinguished by the fact that the rear doors are frameless, and that the fixed door panes extend as far as the front doors. These measures improve the visual appearance in the side view of the motor vehicle in a pane region. Advantages also result from the door panes of the rear doors being fixed in comparison with lowerable door panes. In particular, the door body need not have a window lifting mechanism for lifting and lowering a door pane and the door body need not provide an installation space for the lowered door pane itself within the door body. Thus, installation space and packaging advantages result. Furthermore, a door well of the door body of the rear doors can be connected on its upper side between an inner side and an outer side, since the fixed door pane does not have to be lowered in between. This results in increased mechanical rigidity in this region.

The fixed door panes can be fastened to the rear doors in a very different way. In one preferred embodiment, the fixed door panes can be screwed or fixed adhesively to the associated rear doors. Other fastening types are likewise fundamentally conceivable.

Each of the front doors may have a frame and a frame trim panel. The frame trim panel may extend in the vehicle vertical direction and may be configured to cover the frame of the relevant front door in a region that adjoins the rear door.

The motor vehicle that is viewed from the side may have a first exposed joint between the fixed door pane of the rear door and the frame trim panel of the front door, and a second exposed joint between the frame trim panel and the lowerable door pane of the front door. Therefore, the number of exposed joints in comparison with the prior art four-door or five-door motor vehicles with framed front doors can be reduced from three exposed joints to two exposed joints. This results in an improved visual appearance in the side view of the motor vehicle. Furthermore, the reduction of the number of exposed joints in the pane region brings about a reduction of the drag coefficient (resistance coefficient) of the motor vehicle. Moreover, disruptive noise, in particular wind noise, can be reduced effectively.

Each of the two front doors may be of frameless configuration. Thus, frame trim parts in the front doors can be dispensed with in an advantageous way.

The fixed door panes of the rear doors may be configured to form a window guide for the lowerable door pane of the front door that is adjacent to the rear door. Thus, the lowerable door pane of the front door directly adjoins the fixed door pane of the adjacent rear door.

The motor vehicle that is viewed from the side may have a single exposed joint between the fixed door pane of the rear door and the lowerable door pane of the front door. Therefore, the number of exposed joints in comparison with the known four-door or five-door motor vehicles with frameless front doors can be reduced in an advantageous way from two exposed joints to merely one exposed joint. This results in a greatly improved visual appearance in the side view of the motor vehicle. Furthermore, the reduction of the number of exposed joints in the pane region brings about a reduction of the drag coefficient (resistance coefficient) of the motor vehicle. Moreover, disruptive noise, in particular wind noise, can be reduced effectively by way of said measure.

Further features and advantages of the invention will become clear from the following detailed description with reference to the appended figures.

DETAILED DESCRIPTION

Figure 1:
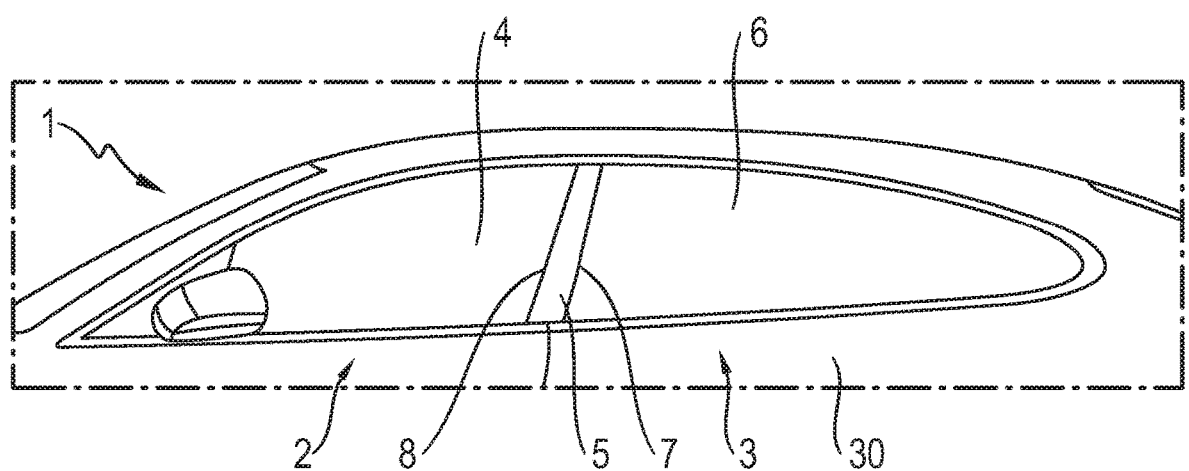
FIG. 1 shows a side view of a part of a motor vehicle configured in accordance with a first exemplary embodiment of the invention.

With reference to FIG. 1, a motor vehicle 1 in accordance with a first embodiment of the invention has a first front door 2 on a first longitudinal side and a first rear door 3 behind the first front door 2 as viewed in the vehicle longitudinal direction. In an analogous way, the motor vehicle 1 has a second longitudinal side that is opposite the first longitudinal side, although not shown explicitly here. The second longitudinal side has a second front door and a second rear door that lies behind the second front door, as viewed in the vehicle longitudinal direction. The front doors 2 of the motor vehicle are configured as framed doors and have a door pane 4 that is lowerable. The frame of each front door 2 has a frame trim part 5 that extends in the vehicle vertical direction and covers the frame in a region that adjoins the rear door 3. The rear doors 3 are of frameless configuration and have a door body 30.

Each of the two rear doors 3 has a fixed door pane 6 that can be embedded, for example, in sections into the door body 30 of the relevant rear door 3 and can be screwed or adhesively bonded to the door body 30. The fixed door pane 6 also can be connected in some other way to the rear door 3, in particular can be screwed or adhesively bonded. Unlike in the case of most four-door or five-door motor vehicles that are known from the prior art, the door panes 6 of the rear doors 3 cannot be lowered, since they are connected fixedly to the associated rear door 3, in particular to the door body 30. The fixed door panes 6 are configured to extend as far as the adjacent front doors 2.

Advantages result from the fixed door panes 6 of the rear doors 3 of the motor vehicle 1. In particular, a window lifting mechanism for lifting and lowering a door pane and an installation space for the lowered door pane within the door body 30 of the rear door 3 do not have to be provided within the door body 30 of the rear door 3, thereby providing advantages and efficiencies with respect to installation space and packaging. Furthermore, a door well of the door body 30 of the rear door 3 can be connected on its upper side between an inner side and an outer side, since the fixed door pane 6 does not have to be lowered in between. This results in an increased mechanical rigidity in this region.

A further advantage of the fixed door pane 6 is that, in the side view of the motor vehicle 1, the number of exposed joints 7, 8 is reduced from three in the prior art to two in a pane region between the front door 2 and the rear door 3. A first exposed joint 7 is between the fixed door pane 6 and the frame trim panel 5 of the front door 2. A second exposed joint 8 is between the frame trim panel 5 and the lowerable door pane 4 of the front door 2. Since the rear door 3 is of frameless configuration and the fixed door pane 6 extends as far as the frame trim panel 5 of the front door 2 in the case of a closed rear door 3, no additional trim panel is required on the rear door 3. Furthermore, the drag coefficient (resistance coefficient) of the motor vehicle 1 can be reduced by reducing the number of exposed joints 7, 8. A further advantage results from the fact that disruptive noise, in particular wind noise, can be reduced effectively.

Figure 2:
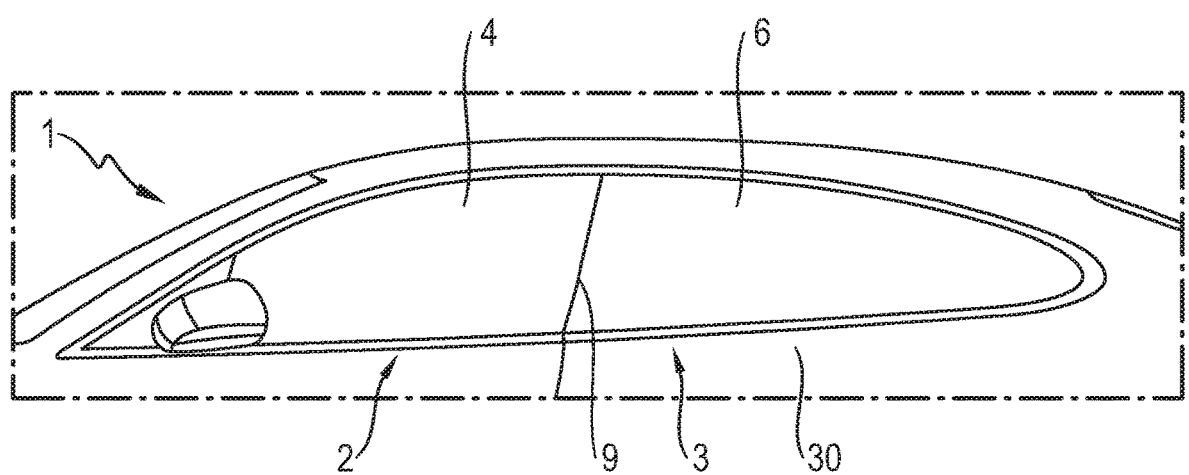
FIG. 2 shows a side view of a part of a motor vehicle configured in accordance with a second exemplary embodiment of the invention.

FIG. 2 shows a second embodiment of a motor vehicle 1 and is described in greater detail in the following text. Components in FIG. 2 that are identical or functionally identical to components in FIG. 1 are provided with the same designations as in FIG. 1. The fundamental construction of the motor vehicle 1 has numerous similarities with the first embodiment, and structural differences are described primarily to avoid repetitions.

In contrast to the first embodiment, the two front doors 2 of the motor vehicle 1 are of frameless configuration in FIG. 2, with the result that there is no frame trim panel 5 as in the first embodiment. The two rear doors 3 on the longitudinal sides of the motor vehicle 1 that lie opposite one another are of frameless configuration and, as in the first embodiment, have a fixed door pane 6. The fixed door pane 6 is formed in such a way that, in the closed position of the rear door 3, it extends as far as the front door 2. The fixed door pane 6 is configured to form a window guide for the lowerable door pane 4 of the front door 2. This achieves a situation where the door pane 4 of the front door 2 can directly adjoin the fixed door pane 6 of the rear door 3. Additionally, neither the front door 2 nor the rear door 3 have a frame trim panel 5. Thus, the number of exposed joints 9 in the pane region can be reduced from two exposed joints (prior art) to a single exposed joint 9. In the side view of the motor vehicle 1, in the case of a closed front door 2 and a closed rear door 3, the one exposed joint 9 is between the lowerable door pane 4 of the front door 2 and the fixed door pane 6 of the rear door 3. This reduction in the number of exposed joints 9 improves the visual appearance of the motor vehicle 1 in the side view considerably. Furthermore, the drag coefficient (resistance coefficient) of the motor vehicle 1 is reduced. A further advantage of the reduction in the number of exposed joints 9 is that disruptive noise, in particular wind noise, can be reduced effectively.

What is claimed is:

1. A motor vehicle, comprising:
    a first front door and a first rear door arranged behind one another on a first longitudinal side of the motor vehicle, and
    a second front door and a second rear door arranged behind one another on a second longitudinal side of the motor vehicle, which second longitudinal side is opposite the first longitudinal side, each of the two front doors having a lowerable door pane, and each of the two rear doors having a fixed door pane, the fixed door panes being frameless, and the fixed door panes extending as far as the front doors.

2. The motor vehicle of claim 1, wherein the fixed door panes are screwed to the associated rear doors.

3. The motor vehicle of claim 1, wherein the fixed door panes are bonded adhesively to the associated rear doors.

4. The motor vehicle of claim 1, wherein each of the two front doors has a frame and a frame trim panel, the frame trim panel extending in a vehicle vertical direction and being configured to cover the frame of the respective front door in a region that adjoins the rear door.

5. The motor vehicle of claim 4, wherein the motor vehicle, in a side view, has a first exposed joint between the fixed door pane of the rear door and the frame trim panel of the front door, and a second exposed joint between the frame trim panel and the lowerable door pane of the front door.

6. The motor vehicle of claim 1, wherein the lowerable door pane on each of the two front doors is frameless.

7. The motor vehicle of claim 6, wherein the fixed door panes of the rear doors are configured to form a window guide for the lowerable door pane of the front door that is adjacent to the respective rear door.

8. The motor vehicle of claim 7, wherein the motor vehicle, in a side view, has a single exposed joint between the fixed door pane of the rear door and the lowerable door pane of the front door.

* * * * *